L. J. D. HEALY.
DEMOUNTABLE RIM.
APPLICATION FILED NOV. 10, 1913.
1,100,875.
Patented June 23, 1914.
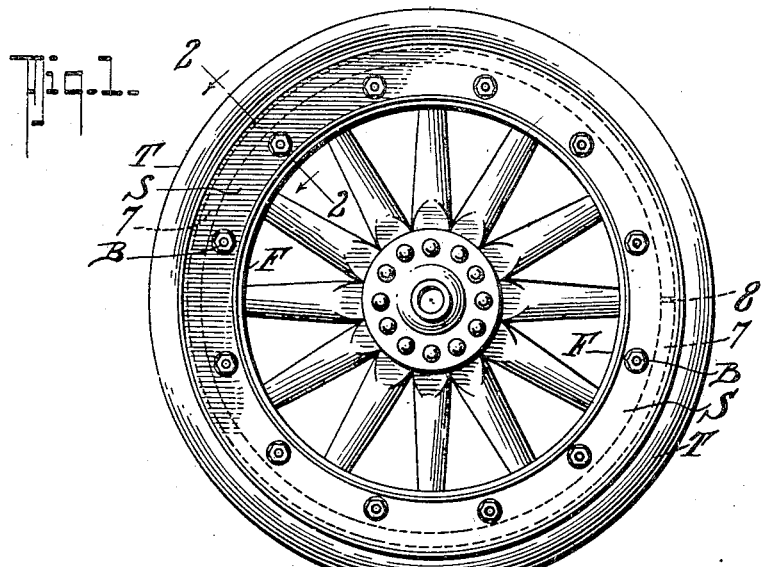
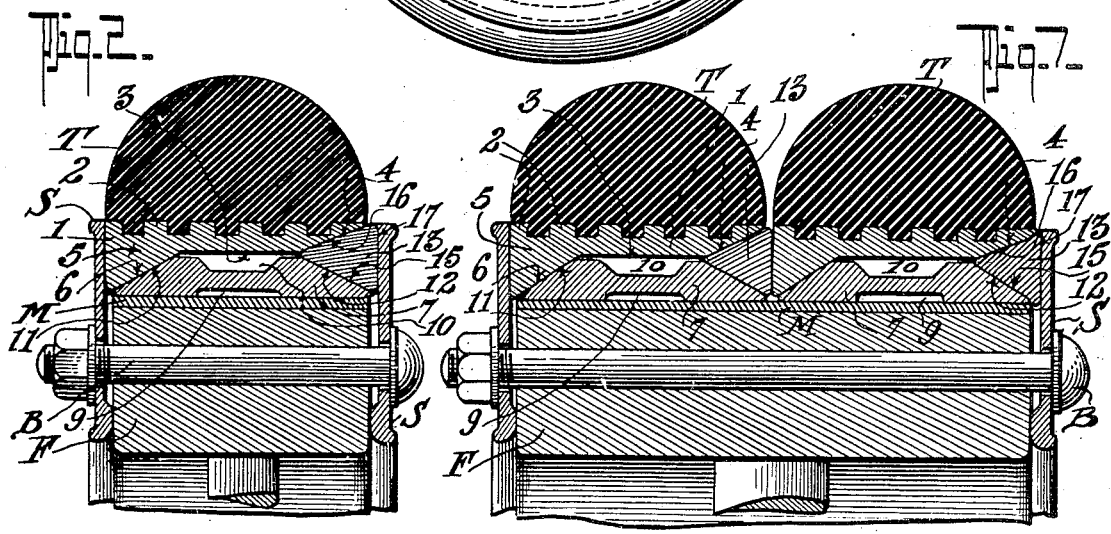
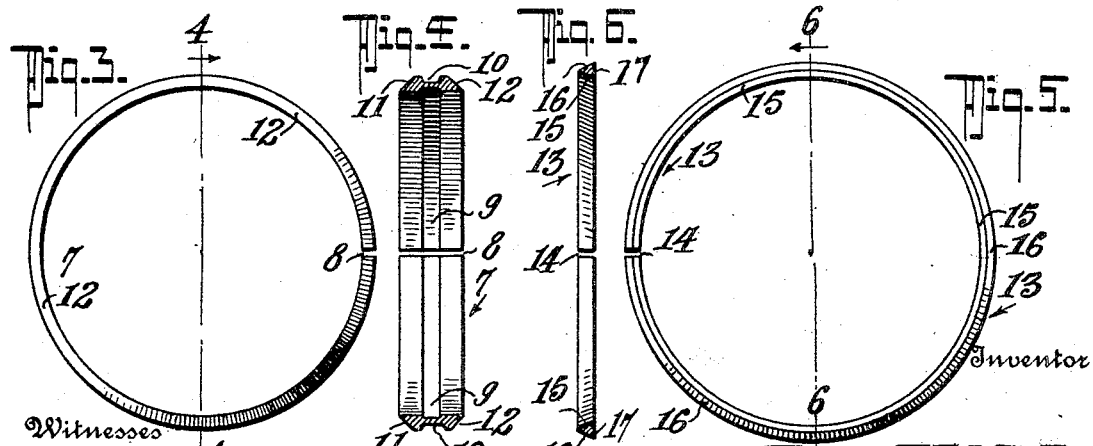

UNITED STATES PATENT OFFICE.

LEON JAMES DYSON HEALY, OF NEW BRITAIN, CONNECTICUT.

DEMOUNTABLE RIM.

1,100,875.    Specification of Letters Patent.    Patented June 23, 1914.

Application filed November 10, 1913. Serial No. 800,206.

*To all whom it may concern:*

Be it known that I, LEON JAMES DYSON HEALY, a citizen of the United States, residing at New Britain, in the county of Hartford and State of Connecticut, have invented certain new and useful Improvements in Demountable Rims; and I do declare the following to be a full, clear, and exact description of the invention, such as will enable others skilled in the art to which it appertains to make and use the same.

This invention relates to resilient tires and wheels, and more especially it is a demountable rim provided with peculiar means for fastening it onto a wheel.

The object of the invention is to produce a rim of this character which by preference carries a solid or cushion tire such as is used on heavy vehicles or motor trucks, and to attach it to the felly of the wheel by means of devices which are simple, inexpensive, and easily operated, and yet which hold the rim and tire upon the wheel in a very rigid manner and permit the same to be duplicated around the felly in case the device is applied to the wheel of a very heavy vehicle.

With these objects, the invention consists in the details of construction hereinafter more fully described and claimed, and as shown in the drawings wherein—

Figure 1 is a side elevation of a wheel embodying this invention. Fig. 2 is an enlarged cross section taken on about the line 2 of Fig. 1. Fig. 3 is a side elevation of the base band, and Fig. 4 is a vertical section thereof, taken on the line 4—4 of Fig. 3. Fig. 5 is a side elevation of the spreader ring, and Fig. 6 a vertical section thereof taken on about the line 6—6 of Fig. 5. Fig. 7 is a cross section, similar to Fig. 2, showing the use of two of these improved devices around a single and somewhat wider felly than is shown in Fig. 2.

The construction of the wheel on which this improved demountable rim is used is unimportant, and in the accompanying drawings we are concerned only with the felly F, preferably faced on its periphery with metal as at M, the two side flanges S, and the bolts B passing through the flanges and between them through the felly to hold the parts in place. The nuts of these bolts may stand at the inside or the outside of the wheel, and in fact the bolts could have nuts on both ends or could be secured in place by any suitable means forming no part of the present invention. Surrounding the felly and standing between the side flanges S are the demountable rim and its fastening devices described in detail below, and said rim in the present case is shown as carrying a solid or cushion tire T which is preferably of rubber or the like and may be secured to the outer face of the rim proper in any suitable manner.

Referring now to the details of the present invention, the rim 1 in the present case is shown as provided with projections 2 on its outer face around which the tire T is molded or secured in any suitable way. Its inner face is by preference flat for about the central third of its width as shown at 3, said face from one edge of the flattened portion is beveled radially outward to the edge of the rim as shown at 4, and for the remaining third the rim is thickened or provided with a rib 5 whose inner face is beveled radially inward as seen at 6. Surrounding the felly F (or around its metallic facing M if the same be employed) is what I will call a "base band" 7 (see Fig. 3) formed in the shape of a ring and split at one side as at 8. Internally this annular member is provided with a groove 9 to reduce the area which contacts with the metallic facing M and therefore to prevent these parts from rusting together; externally it is provided with a somewhat wider and slightly deeper groove 10 which underlies the flat portion 3 of the rim 1; and at either side of this groove 10 the outer face is beveled radially inward as at 11 and 12, the bevel 11 underlying the beveled face 6 of the rib 5 as seen in Fig. 2. The fastening device is completed by the provision of what I will call a "spreader ring" 13 (see Fig. 5) which is by preference split at one side as shown at 14; and in cross section the body of this ring is triangular, its inner beveled face 15 contacting with the bevel 12 of the band 7, its outer face 16 contacting with the bevel 4 of the rim 1, and its flat face 17 contacting with the inner face of the side flange S next adjacent.

In use the parts are assembled as seen in Fig. 2, and tightening up on the bolts B draws the flanges S toward each other so that the spreader ring 13 is pressed into the space between the bevels 4 and 12 and that edge of the rim 1 (its thinner edge) is forced radially outward away from the felly F; meanwhile the inward pressure on this spreader ring 13 causes the base band 7 to move across the face of the felly (or its metal facing M) so that the bevel 11 on the other side of said band contacts with the beveled face 6 of the rib 5, and this edge also of the rim 1 is forced radially outward. Such action occurs simultaneously at both edges, and completely around the wheel, and the result is that the rim and the tire carried thereby will be quickly locked upon the felly. When now it is desired to remove the rim and tire, the nuts are taken off the bolts B and one flange S removed—preferably that flange which is adjacent the rib 5 on the rim 1. As soon as the tension on the bolts relaxes, the three metal members will loosen slightly at the points where they contact, and if not they may be loosened by tapping them with the hammer. Thereafter the tire and rim can be drawn off the wheel, leaving the spreader 13 and band 7 thereon.

Assuming that we have merely a defective tire which is to be replaced, the use of a demountable rim permits a second rim with its new tire to be slipped on in place of the defective one, so that the latter can be repaired at leisure; and in putting on this new rim it is inserted with its beveled edge 4 first, so that this edge passes completely over the base band 7 and rides onto the outer face 16 of the ring 13. Finally the side flange S which has been removed is replaced, and the nuts are restored to the bolts and tightened up. This action forces the rim (and with it the tire) toward the right as shown in Fig. 2 and causes the outward bevel 4 at one edge of the rim to ride along the outer face 16 of the spreader 13, at the same time that the inward bevel 6 on the rib 5 at the other end of the rim rides along the bevel 11 at the left side of the base band 7. The result is that both edges of the rim are forced radially outward from the wheel to the same extent, and the demountable rim and its tire are clamped in place reliably, quickly, and in true parallelism with the felly.

In Fig. 7 is shown how this idea may be amplified for application to a broader felly, such as those employed on heavy motor trucks, by simply duplicating the parts above described and mounting two tires, rims, and sets of fastening devices, between the side flanges S. In this case we have shown both rims so disposed that they must be removed to the left, and therefore after the left-hand rim and its tire have been taken off it will be necessary to take off the three members of the fastening device at the left of the felly, before the right hand tire can be removed. However, it is quite obvious that it would be possible to reverse the position of the right hand member and its fastening device, and then each rim and its tire could be taken off from the adjacent edge of the felly without interfering with the position of the other in any way. The proportions and materials are not essential to the successful operation of this invention.

What is claimed as new is:

1. The combination with a felly, removable side flanges thereto, and means for drawing the flanges toward each other; of a demountable rim disposed between said flanges, its inner face being flat at the center of its width, beveled radially outward along one edge and beveled radially inward along the other edge, a tire carried by the outer face of said rim, a base band surrounding the felly and having its outer face beveled radially inward along both edges and grooved between said bevels, the inner face of the base band being also grooved between its edges, and a split spreader ring of triangular cross section whose outer face is beveled coincident to the outward bevel along one edge of the rim and whose inner face is beveled coincident to the adjacent beveled edge of the spreader, the base of this ring resting against the contiguous flange.

2. The combination with a felly surrounded by a metal facing, removable flanges along both edges of said felly, and bolts passing through the flanges and felly; of a pair of demountable rims disposed edge to edge between said flanges and each carrying a tire on its outer face, the inner face of each rim being outwardly beveled along one edge and having along its other edge a rib whose inner face is inwardly beveled, a base band interposed between each rim and the metal facing of the felly and having its outer face oppositely beveled along its edges, the inner and outer faces of said band being each grooved about centrally thereof, and a triangular spreader ring interposed between the outwardly beveled edge of each rim and the contiguous bevel of the band, all parts being so disposed that tightening up on said bolts causes said parts to bind tightly against one another to frictionally retain the rims in position.

In testimony whereof I have hereunto set my hand in presence of two subscribing witnesses.

LEON JAMES DYSON HEALY.

Witnesses:
  G. J. STEARNS,
  JAMES HEALY.